(12) United States Patent
Ohashi et al.

(10) Patent No.: US 11,040,413 B2
(45) Date of Patent: Jun. 22, 2021

(54) SPOT WELDING APPARATUS, SPOT WELDING METHOD, AND JOINT STRUCTURE

(71) Applicant: KAWASAKI JUKOGYO KABUSHIKI KAISHA, Kobe (JP)

(72) Inventors: Ryoji Ohashi, Kobe (JP); Yoshitaka Muramatsu, Akashi (JP); Masahiro Miyake, Kobe (JP); Takuya Fukuda, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/097,496

(22) PCT Filed: Apr. 27, 2017

(86) PCT No.: PCT/JP2017/016816
§ 371 (c)(1),
(2) Date: Oct. 29, 2018

(87) PCT Pub. No.: WO2017/188399
PCT Pub. Date: Nov. 2, 2017

(65) Prior Publication Data
US 2019/0143442 A1 May 16, 2019

(30) Foreign Application Priority Data
Apr. 28, 2016 (JP) .............................. JP2016-090611

(51) Int. Cl.
*B23K 11/11* (2006.01)
*B23K 20/12* (2006.01)
*B23K 28/02* (2014.01)

(52) U.S. Cl.
CPC ............. *B23K 11/115* (2013.01); *B23K 11/11* (2013.01); *B23K 20/12* (2013.01); *B23K 20/123* (2013.01); *B23K 20/1245* (2013.01); *B23K 28/02* (2013.01)

(58) Field of Classification Search
None
See application file for complete search history.

(56) References Cited

U.S. PATENT DOCUMENTS 5,111,019 A * 5/1992 Torii .................... B23K 11/314
219/87
8,052,029 B1 * 11/2011 Sigler .................. B23K 20/123
228/103

(Continued)

FOREIGN PATENT DOCUMENTS

DE 102016206759 A1 1/2017
JP 2004-276724 A 10/2004

(Continued)

*Primary Examiner* — Devang R Patel
(74) *Attorney, Agent, or Firm* — Oliff PLC

(57) ABSTRACT

A spot welding apparatus which performs spot welding of a plurality of plate materials which are lapped to each other, comprises a displacement driving unit which displaces lapped portions of the plurality of plate materials and a tool relatively to each other; a rotation driving unit which rotates the tool; and a controller which controls the displacement driving unit and the rotation driving unit so that the tool is plunged into the lapped portions in a state in which the tool is rotated to perform friction stir spot welding. The controller controls the displacement driving unit so that at least one friction stir spot weld is formed in a region of the lapped portions which is between a plurality of resistance spot welds formed by resistance spot welding.

7 Claims, 4 Drawing Sheets

(56) References Cited

U.S. PATENT DOCUMENTS

| | | | | |
|---|---|---|---|---|
| 8,076,604 | B2* | 12/2011 | Rippl | B23K 11/115 |
| | | | | 219/91.2 |
| 2004/0016723 | A1* | 1/2004 | Rohner | B23K 11/312 |
| | | | | 219/86.8 |
| 2008/0149687 | A1* | 6/2008 | Garnett | B23K 31/125 |
| | | | | 228/104 |
| 2011/0017710 | A1* | 1/2011 | Yasunaga | B23K 11/115 |
| | | | | 219/87 |
| 2012/0261457 | A1* | 10/2012 | Ohashi | B23K 20/1235 |
| | | | | 228/102 |
| 2014/0166628 | A1* | 6/2014 | Ryu | B23K 11/312 |
| | | | | 219/86.7 |

FOREIGN PATENT DOCUMENTS

| | | |
|---|---|---|
| JP | 2006-167747 A | 6/2006 |
| JP | 2008-030100 A | 2/2008 |
| JP | 2009-202828 A | 9/2009 |
| JP | 5605405 B2 | 10/2014 |
| JP | 2015-033706 A | 2/2015 |

* cited by examiner

SPOT WELDING APPARATUS, SPOT WELDING METHOD, AND JOINT STRUCTURE

TECHNICAL FIELD

The present invention relates to a spot welding apparatus, a spot welding method, and a joint structure, in which a plurality of plate materials are lapped to each other and spot welded to each other.

BACKGROUND ART

In assembly steps of an automobile, an aircraft, a railway vehicle, or the like, a plurality of plate materials are lapped to each other, and welded (joined) to each other by resistance spot welding, to manufacture a joint structure. To increase a stiffness of the joint structure, a welding (joining) pitch of resistance spot welds (resistance spot welded portions) may be reduced, and the number of welding spots (welding spotting points) may be increased. However, if spacing between the resistance spot welds is small in a case where the resistance spot welding is performed, a part of a welding current from a welding electrode flows to an adjacent resistance spot weld, and a reactive current is generated. If this reactive current is increased, the welding current flowing through portions to be spot welded is reduced, so that a desired welding (joining) strength cannot be obtained in some cases. In view of this, Patent Literature 1 discloses that the reactive current is reduced by forming a slit to make discontinuity in at least a part of a region connecting a pair of resistance spot welds, of a pair of plate materials.

CITATION LIST

Patent Literature

Patent Literature 1: Japanese Patent No. 5605405

SUMMARY OF INVENTION

Technical Problem

However, the method disclosed in Patent Literature 1 has a problem that a plate material strength of a region that is in the vicinity of the slit is reduced, and the stiffness of the joint structure is reduced, although the welding strength of the resistance spot welds is high. Also, in methods other than the method disclosed in Patent Literature 1, the welding current may be set to be higher in view of the reactive current. However, if the welding current is increased, a rapid welding phenomenon occurs, and the material is scattered due to a pressure applied by the welding electrode. This may result in a reduced welding strength and a degraded external appearance quality. A frequency at which the reactive current is generated depends on the diameter of the resistance spot weld, or a contact state of the lapped plate materials (gap between the lapped plate materials). For this reason, if the welding pitch is reduced, non-uniformity of the welding strength occurs.

In view of the above-described circumstances, an object of the present invention is to provide a high joint strength and a stable quality while suppressing a reactive current in resistance spot welding.

Solution to Problem

According to an aspect of the present invention, there is provided a spot welding apparatus which performs spot welding of a plurality of plate materials which are lapped to each other, the spot welding apparatus comprising: a displacement driving unit which displaces lapped portions of the plurality of plate materials and a tool relatively to each other; a rotation driving unit which rotates the tool; and a controller which controls the displacement driving unit and the rotation driving unit so that the tool is plunged into the lapped portions in a state in which the tool is rotated to perform friction stir spot welding, wherein the controller controls the displacement driving unit so that at least one friction stir spot weld is formed in a region of the lapped portions which is between a plurality of resistance spot welds formed by resistance spot welding.

In accordance with this configuration, by forming the friction stir spot weld (friction stir spot welded portion) in the region which is between the plurality of resistance spot welds (resistance spot welded portions), a welding pitch between the spot welds (the resistance spot weld and the friction stir spot weld) can be reduced as a whole, while keeping a long distance between the resistance spot welds. Since a distance between the resistance spot welds is made long and thereby a reactive current is suppressed, it becomes possible to prevent reduction of a welding (joining) strength, degradation of an external appearance quality, and non-uniformity of the welding strength. In addition, since the welding pitch between the spot welds can be reduced as a whole, a high joint strength can be obtained.

The controller may set a welding pitch between the at least one friction stir spot weld and each of the plurality of resistance spot welds to a welding pitch with which a tensile shear strength in a case where a pair of friction stir spot weld and resistance spot weld are formed in a pair of plate materials is higher than a tensile shear strength in a case where a pair of resistance spot welds are formed in the pair of plate materials.

In accordance with this configuration, it becomes possible to suitably prevent reduction of the welding strength due to the reactive current and improve the welding strength by reduction of the welding pitch, in the resistance spot welding.

The plurality of plate materials may be steel materials, and in a case where a welding pitch between the at least one friction stir spot weld and each of the plurality of resistance spot welds is Y and a thickness of each of a pair of plate materials is X, the controller may set the welding pitch to meet $Y \leq -1.4X^2+18.6X+0.6$ in a case where the pair of plate materials are low-carbon steel, and the controller may set the welding pitch to meet $Y \leq -1.9X^2+25.5X+2.1$ in a case where the pair of plate materials are medium-carbon steel or low-alloy steel.

In accordance with this configuration, it becomes possible to suitably prevent reduction of the welding strength due to the reactive current and improve the welding strength by reduction of the welding pitch, in the resistance spot welding.

The controller may set a welding pitch between the at least one friction stir spot weld and each of the plurality of resistance spot welds to a value which is larger than a sum of a radius of each of the plurality of resistance spot welds and a radius of the at least one friction stir spot weld.

In accordance with this configuration, it becomes possible to prevent a situation in which the friction stir spot weld and the resistance spot weld overlap with each other, and thereby a total welding (joining) area is reduced. As a result, the welding strength can be effectively improved.

According to another aspect of the present invention, there is provided a spot welding method which performs spot welding of a pair of plate materials which are lapped to each other, the spot welding method comprising: performing resistance spot welding of lapped portions of the pair of plate materials to form a plurality of resistance spot welds; and performing friction stir spot welding of a region of the lapped portions which is between the plurality of resistance spot welds to form at least one friction stir spot weld.

According to a further aspect of the present invention, there is provided a joint structure formed by performing spot welding of a pair of plate materials which are lapped to each other, the joint structure comprising: a plurality of resistance spot welds formed in lapped portions of the pair of plate materials; and at least one friction stir spot weld formed in a region of the lapped portions which is between the plurality of resistance spot welds.

Advantageous Effects of Invention

In accordance with the present invention, it becomes possible to provide a high joint strength and a stable quality while suppressing a reactive current in resistance spot welding.

DESCRIPTION OF EMBODIMENTS

Hereinafter, the embodiment will be described with reference to the drawings.

Figure 1:
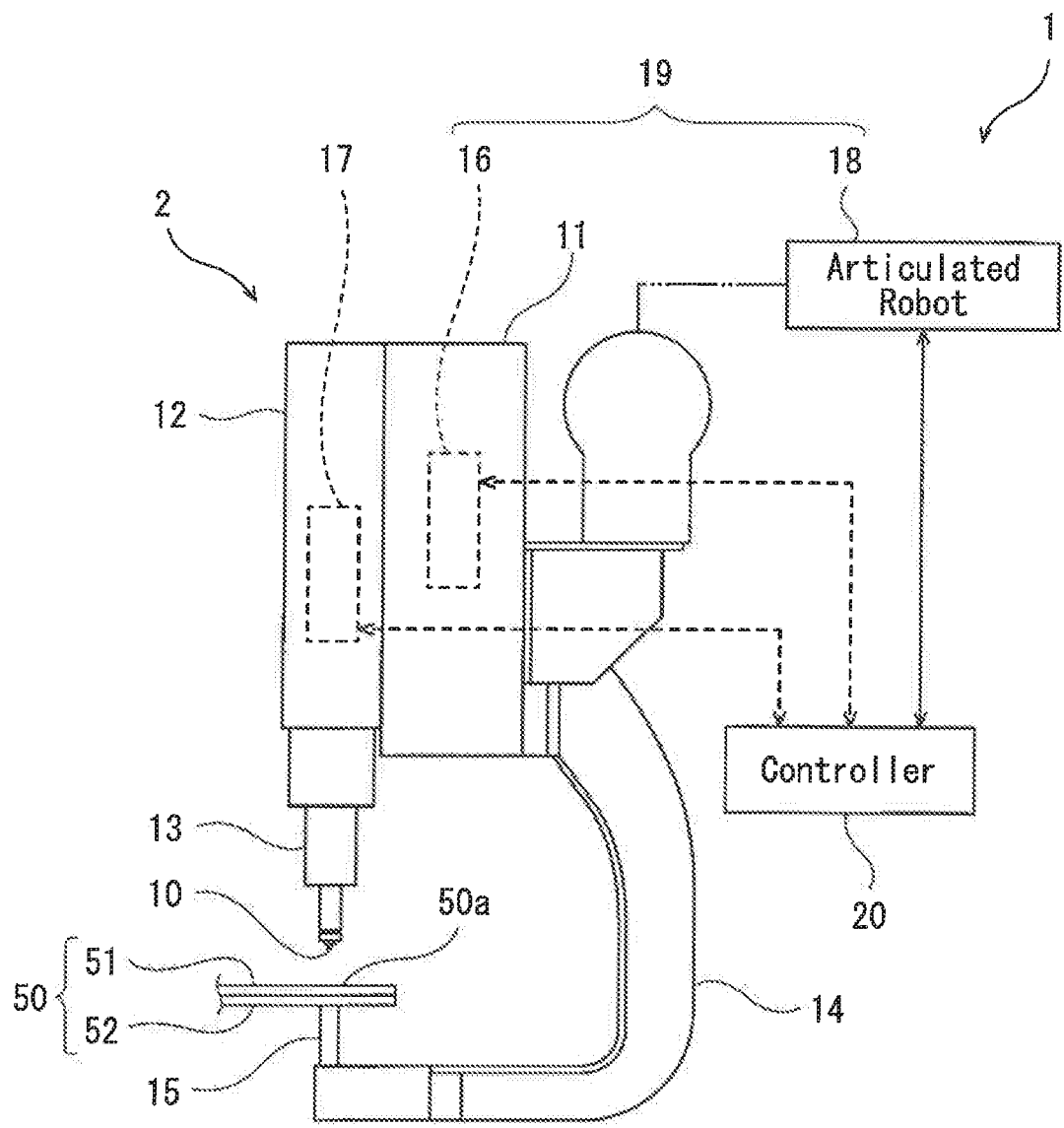
FIG. 1 is a view schematically showing the configuration of a friction stir spot welding device of a spot welding apparatus according to an embodiment.

FIG. 1 is a view schematically showing the configuration of a friction stir spot welding device 2 of a spot welding apparatus 1 according to the embodiment. As shown in FIG. 1, a workpiece 50 includes a pair of plate materials 51, 52 which are lapped to each other. The friction stir spot welding device 2 is configured to perform spot welding of lapped portions 50a of the pair of plate materials 51, 52. The friction stir spot welding device 2 includes a base 11, a movable member 12 mounted on the base 11, and a tool retaining member 13 protruding from the movable member 12 toward the workpiece 50. The movable member 12 is mounted on the base 11 so that the movable member 12 is slidable along the axis line of the tool retaining member 13. The tool retaining member 13 is rotatable around its axis line. A tool 10 is detachably mounted on the tip end portion of the tool retaining member 13. A curved frame 14 which is curved in a substantially-L shape is secured to the base 11. The curved frame 14 extends to a location at which its tip end portion faces the tool 10. A support base 15 is provided at the tip end portion of the curved frame 14 to support the workpiece 50.

The base 11 is provided with a linear motion driving unit 16 which slides the movable member 12 in the axial direction of the tool retaining member 13. The linear motion driving unit 16 slides the movable member 12 to advance and retract the tool 10 with respect to the workpiece 50. The movable member 12 is provided with a rotation driving unit 17 which rotates the tool retaining member 13 around the axis line of the tool retaining member 13. The rotation driving unit 17 rotates the tool retaining member 13 to rotate the tool 10. An articulated (multi-joint) robot 18 is mounted on the base 11. The articulated robot 18 displaces the base 11 to displace the tool 10 to a desired position with respect to the workpiece 50. In brief, the linear motion driving unit 16 and the articulated robot 18 serve as a displacement driving unit 19 which displaces the workpiece 50 and the tool 10 relatively to each other.

The friction stir spot welding device 2 includes a controller 20 which controls the linear motion driving unit 16, the rotation driving unit 17, and the articulated robot 18. The controller 20 may be a single control unit with an integrated function, or a plurality of control units with distributed functions. The controller 20 includes a processor, a volatile memory, a non-volatile memory, an I/O interface, or the like. In response to a command input via the I/O interface by an input device (e.g., computer or teaching pendant) which is not shown, the processor of the controller 12 performs calculations (computations) by use of the volatile memory based on an operation program stored in the non-volatile memory, and the controller 12 communicates with the rotation driving unit 17 and the displacement driving unit 19 via the I/O interface. The friction stir spot welding device 2 performs friction stir spot welding in such a way that the controller 20 controls the rotation driving unit 17 and the displacement driving unit 19 to plunge the tool 10 into the lapped portions 50a of the pair of plate materials 51, 52 in a state in which the tool 10 is rotated, and to stir and plasticize a portion softened by friction heat, of the lapped portions 50a.

Figure 2:
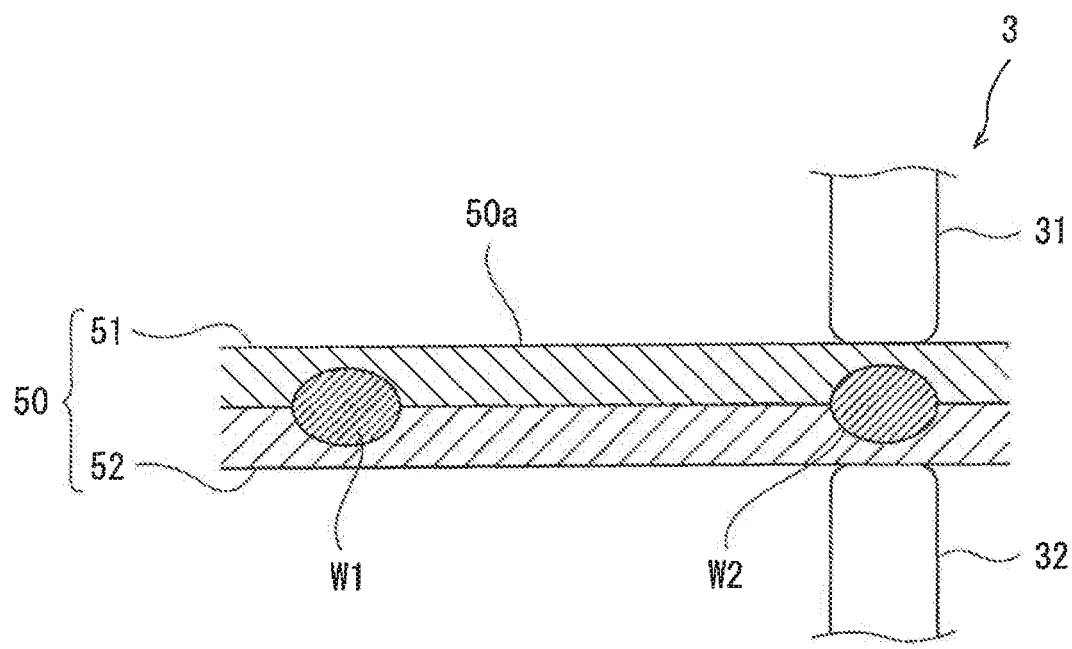
FIG. 2 is a cross-sectional view for explaining a resistance spot welding step.

FIG. 2 is a cross-sectional view for explaining a resistance spot welding step. As shown in FIG. 2, the spot welding apparatus 1 of the present embodiment further includes a resistance spot welding device 3. The resistance spot welding device 3 includes a pair of welding electrodes 31, 32, an actuator (not shown) which displaces the welding electrodes 31, 32, and a controller (not shown) which controls the actuator. The resistance spot welding device 3 performs resistance welding of the lapped portions 50a of the pair of plate materials 51, 52 by applying an electric current, in a state in which the lapped portions 50a are sandwiched between the pair of welding electrodes 31, 32, to form a plurality of resistance spot welds (resistance spot welded portions) W1, W2 (nuggets) in the lapped portions 50a, with a predetermined gap between the resistance spot welds W1, W2. In this way, the pair of plate materials 51, 52 are spot welded (joined) to each other.

Figure 3:
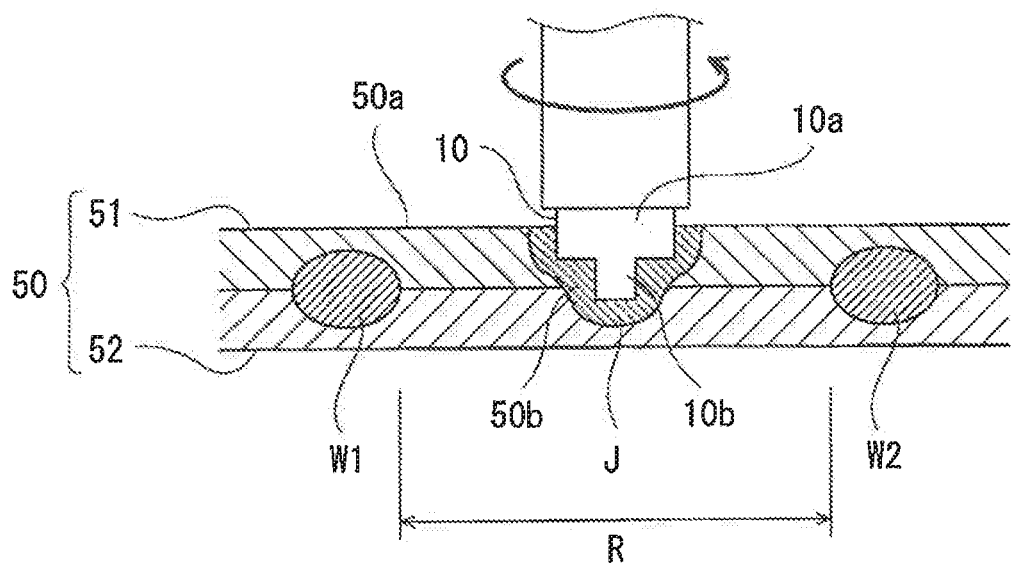
FIG. 3 is a cross-sectional view for explaining a friction stir spot welding step.

FIG. 3 is a cross-sectional view for explaining a friction stir spot welding step. As shown in FIG. 3, the friction stir spot welding device 2 forms at least one friction stir spot weld (friction stir welded portion) J in a region R which is between the plurality of resistance spot welds W1, W2, of the lapped portions 50a of the pair of plate materials 51, 52 so that the pair of plate materials 51, 52 are spot welded (joined) to each other. The tool 10 includes a tool body 10a, and a pin 10b protruding from the center of the tool body 10a toward the workpiece 50 and having a diameter smaller than that of the tool body 10a.

In the friction stir spot welding, the controller 20 (see FIG. 1) controls the rotation driving unit 17 so that the rotation speed of the tool 10 reaches a target rotation speed. In this state, the controller 20 controls the linear motion driving unit 16 to displace the tool 10 so that the pin 10b presses the lapped portions 50a of the workpiece 50. Then, the pin 10b of the tool 10 softens the lapped portions 50a of the workpiece 50 by friction heat. The pin 10b stirs and plasticizes a softened portion 50b. After passage of a predetermined welding time (plunge time of the pin 10b), the controller 20 causes the linear motion driving unit 16 to displace the tool 10 in a direction in which the tool 10 is pulled out (drawn out) of the workpiece 50. After the tool 10 is pulled out of the workpiece 50, the softened portion 50b is cooled and cured (hardened), and thus the friction stir spot weld J is formed. In the friction stir spot welding, no electric current is applied to the plate materials 51, 52, and therefore, the problem associated with the reactive current does not arise. As described above, the lapped portions 50a of the pair of plate materials 51, 52 are welded (joined) to each other by use of both of the resistance spot welding and the friction stir spot welding, and thus a joint structure 100 is formed.

Figure 4:
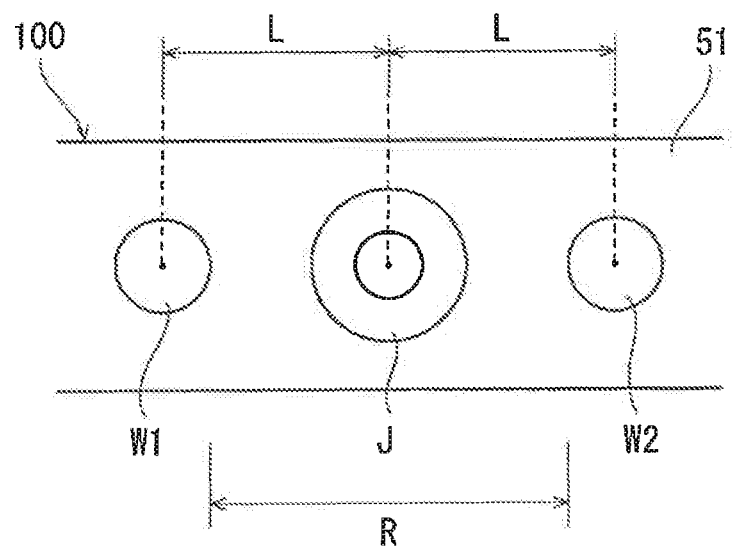
FIG. 4 is a plan view of major constituents of a joint structure.

FIG. 4 is a plan view of major constituents of the joint structure 100. As shown in FIGS. 3 and 4, the joint structure 100 is formed by performing spot welding of the pair of plate materials 51, 52 which are lapped to each other. The joint structure 100 is used in a structure body such as an automobile, an aircraft, a railway vehicle, or the like. The joint structure 100 includes the pair of resistance spot welds W1, W2 formed in the lapped portions 50a of the pair of plate materials 51, 52, and one friction stir spot weld J formed in the region R which is between the pair of resistance spot welds W1, W2. A welding (joining) pitch L between the friction stir spot weld J and each of the resistance spot welds W1, W2, i.e., a distance L between the center of the friction stir spot weld J and the center of each of the resistance spot welds W1, W2, is preferably set to a value within a predetermined range. Hereinafter, a suitable range of the welding pitch L will be described.

Figure 5:
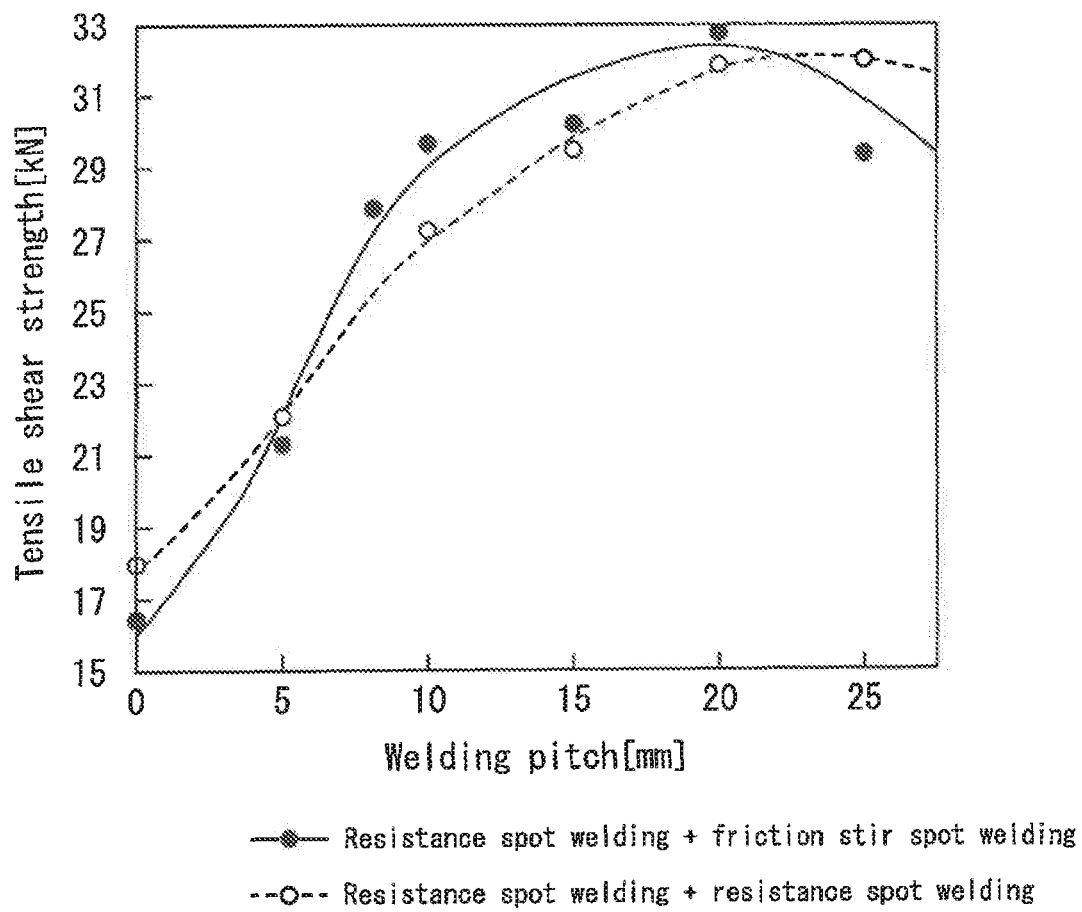
FIG. 5 is a graph showing a relation between a welding pitch and a tensile shear strength in a tensile shear test.

FIG. 5 is a graph showing a relation between the welding pitch and a tensile shear strength in a tensile shear test. In this tensile shear test, as a pair of plate materials constituting the joint structure, DP 980 steel plates (tensile strength 980 MPa) which were low-carbon steel were used, and the thickness of each of the plate materials was set to 1.2 mm. Black plots of FIG. 5 indicate results (hereinafter will be referred to as "resistance spot welding+friction stir spot welding") of the tensile shear test conducted for the joint structure including one resistance spot weld and one friction stir spot weld. A solid line is an approximate line of these black plots. White plots of FIG. 5 indicate results (hereinafter will be referred to as "resistance spot welding+resistance spot welding") of the tensile shear test conducted for the joint structure including two resistance spot welds. A broken line is an approximate line of these white plots.

As can be seen from FIG. 5, in a case where the welding pitch is in a range of 6 mm to 20 mm (the welding pitch is 6 mm or more and 20 mm or less), the tensile shear strength of the "resistance spot welding+friction stir spot welding" is higher than that of the "resistance spot welding+resistance spot welding". In a case where the welding pitch is excessively short, a welding pitch between the resistance spot weld and the friction stir spot weld is shorter than a sum of a radius of the resistance spot weld and a radius of the friction stir spot weld, the resistance spot weld and the friction stir spot weld overlap with each other, and thereby a total welding (joining) area is reduced. As a result, the effect of improving the joint strength is reduced. In view of this, the welding pitch is preferably set to 6 mm or more to prevent the resistance spot weld and the friction stir spot weld from overlapping with each other. Specifically, a lower limit value of the welding pitch with which the tensile shear strength of the "resistance spot welding+friction stir spot welding" is higher than that of the "resistance spot welding+resistance spot welding" depends on the radius of the resistance spot weld and the radius of the friction stir spot weld. In FIG. 5, each of the plots at which the welding pitch is 0 mm indicates the tensile shear strength at a single point. In this case, the tensile shear strength at one point of the resistance spot weld is higher than that of the friction stir spot weld.

In a case where the welding pitch is long, the reactive current generated by flow dividing of the welding current, during the resistance spot welding, is reduced. For this reason, in this case, the tensile shear strength of the "resistance spot welding+resistance spot welding" is higher than that of the "resistance spot welding+friction stir spot welding". However, in a case where the welding pitch is 20 mm or less, the reactive current is increased in the "resistance spot welding+resistance spot welding". For this reason, in this case, the tensile shear strength of the "resistance spot welding+friction stir spot welding" is higher than that of the "resistance spot welding+resistance spot welding". For example, in a comparison of a fracture state after the tensile shear test in a case where the welding pitch was 10 mm, it was observed that in the "resistance spot welding+resistance spot welding", the resistance spot weld at a second spotting point had a diameter smaller than that of the resistance spot weld at a first spotting point, and an interface fracture was formed, while it was observed that in the "resistance spot welding+friction stir spot welding", a base material (base metal) fracture was formed. In view of this, in the joint structure comprising the plate materials formed by the low-carbon steel and each having a thickness of 1.2 mm, the welding pitch between the friction stir spot weld and the resistance spot weld is preferably set to a value that is 20 mm or less. An upper limit value of the welding pitch with which the tensile shear strength of the "resistance spot welding+friction stir spot welding" is higher than that of the "resistance spot welding+resistance spot welding" is varied depending on the material quality and thickness of the plate materials. This will be described below.

Figure 6:
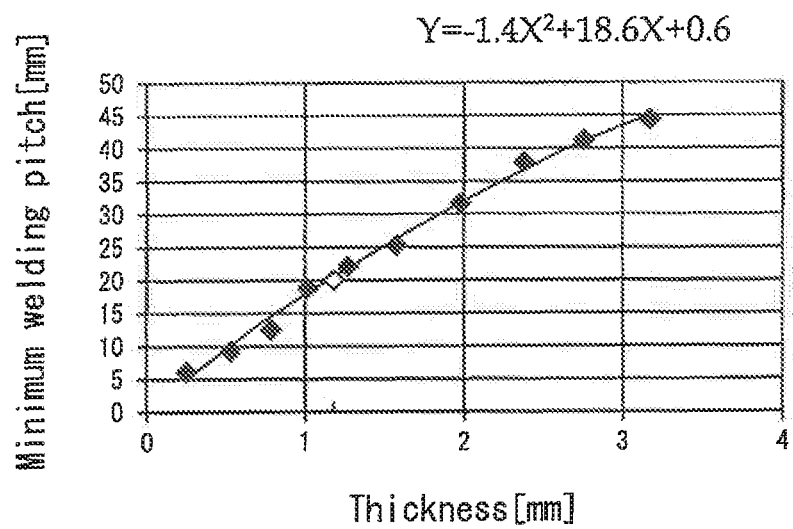
FIG. 6 is a graph showing a relation between a thickness of a plate material and a minimum welding pitch in a case where resistance spot welding of low-carbon steel is performed.
Figure 7:
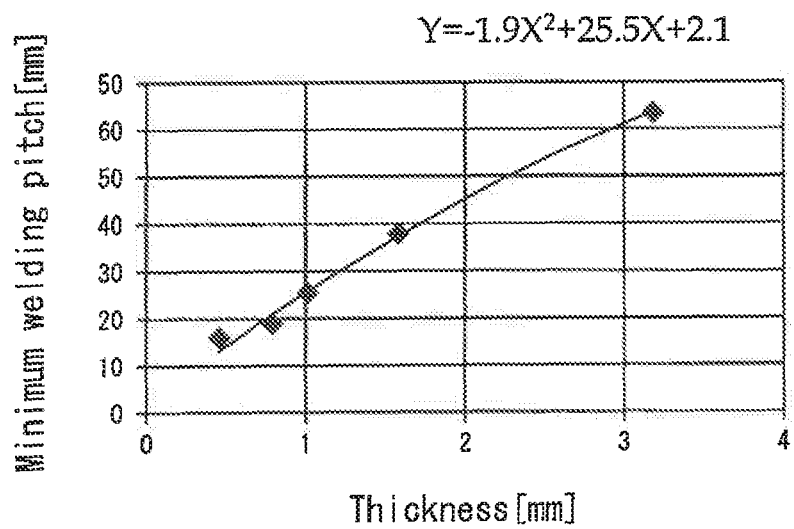
FIG. 7 is a graph showing a relation between the thickness of the plate material and the minimum welding pitch in a case where resistance spot welding of medium-carbon steel or low-alloy steel is performed.

FIG. 6 is a graph showing a relation between the thickness of the plate material and the minimum welding pitch in a case where the resistance spot welding of the low-carbon steel (e.g., S10C) is performed. FIG. 7 is a graph showing a relation between the thickness of the plate material and the minimum welding pitch in a case where the resistance spot welding of medium-carbon steel (e.g., S20C, S35C, S45C) or low-alloy steel (e.g., SNCM439, SCM435) is performed. The low-carbon steel is defined as steel with a carbon content (mass percentage concentration) that is less than 0.20%. The medium-carbon steel is defined as steel with a carbon content that is equal to or more than 0.20% and equal to or less than 0.6%. The low-alloy steel is defined as steel containing alloy elements with a content (mass percentage concentration) that is equal to or less than 5%, the alloy elements being other than iron and carbon. The minimum welding pitch means the lower limit value of the welding pitch which is required in a case where the pair of plate materials are welded (joined) to each other by only the resistance spot welding. In FIG. 6, a solid line is an approximate line of black plots. This solid line is represented by $Y=-1.4X^2+18.6X+0.6$ in a case where the welding pitch is Y (mm) and the thickness is X (mm). In FIG. 7, a solid line is an approximate line of black plots. This solid line is represented by $Y=-1.9X^2+25.5X+2.1$ in a case where the welding pitch is Y (mm) and the thickness is X (mm).

As shown in FIGS. 6 and 7, the minimum welding pitch required in a case where the pair of plate materials are welded (joined) to each other by only the resistance spot welding is longer as the thickness of the plate material is increased. The minimum welding pitch required in a case where the pair of plate materials are welded (joined) to each other by only the resistance spot welding is shorter in a case where the plate materials are the low-carbon steel than in a case where the plate materials are the medium-carbon steel or the low-alloy steel. In summary, the reactive current is more easily generated as the thickness of the plate material is increased, and is less easily generated in the low-carbon steel than in the medium-carbon steel or the low-alloy steel.

A white plot indicating the upper limit value (20 mm) of the welding pitch with which the tensile shear strength of the "resistance spot welding+friction stir spot welding" was higher than that of the "resistance spot welding+resistance spot welding" in the test result (low-carbon steel; thickness 1.2 mm) of FIG. 5 is added to FIG. 6. This white plot is roughly located on the solid line ($Y=-1.4X^2+18.6X+0.6$) of the graph. Therefore, in the joint structure in which the resistance spot weld and the friction stir spot weld are adjacent to each other, preferably, the upper limit value of the welding pitch is set to meet $Y\leq-1.4X^2+18.6X+0.6$ in a case where the plate materials are the low-carbon steel, and is set to meet $Y\leq-1.9X^2+25.5X+2.1$ in a case where the plate materials are the medium-carbon steel or the low-alloy steel.

From the above fact, the controller 20 sets the welding pitch L between the friction stir spot weld J and each of the resistance spot welds W1, W2 to meet $Y\leq-1.4X^2+18.6X+0.6$ in a case where the plate materials 51, 52 are the low-carbon steel. Also, the controller 20 sets the welding pitch L between the friction stir spot weld J and each of the resistance spot welds W1, W2 to meet $Y\leq-1.9X^2+25.5X+2.1$ in a case where the plate materials 51, 52 are the medium-carbon steel or the low-alloy steel. Further, the controller 20 sets the welding pitch L between the friction stir spot weld J and each of the resistance spot welds W1, W2 to a value which is larger than the sum of the radius of the resistance spot weld J and the radius of the friction stir spot weld W1(W2). The controller 20 sets the welding pitch L between the friction stir spot weld J and each of the resistance spot welds W1, W2 to a welding pitch with which the tensile shear strength in a case where a pair of friction stir spot weld and resistance spot weld are formed in the pair of plate materials is higher than that in a case where a pair of resistance spot welds are formed in the pair of plate materials.

In accordance with the above-described configuration, by forming the friction stir spot weld J in the region R which is between the resistance spot welds W1, W2, the welding pitch L between the spot welds (the resistance spot weld and the friction stir spot weld) can be reduced as a whole, while keeping a long distance between the resistance spot welds W1, W2. Since the distance between the resistance spot welds W1, W2 is made long and thereby the reactive current is suppressed, it becomes possible to prevent reduction of the welding strength, degradation of the external appearance quality, and non-uniformity of the welding strength. In addition, since the welding pitch L between the spot welds can be reduced as a whole, the joint strength and the stiffness of the joint structure 100 can be improved.

The controller 20 sets the welding pitch L between the friction stir spot weld J and each of the resistance spot welds W1, W2 so that the tensile shear strength of the "resistance spot welding+friction stir spot welding" is higher than that of the "resistance spot welding+resistance spot welding". Therefore, it becomes possible to suitably prevent reduction of the welding strength due to the reactive current and improve the welding strength by reduction of the welding pitch, in the resistance spot welding. Further, the controller 20 sets the welding pitch L between the friction stir spot weld J and each of the resistance spot welds W1, W2 to a value which is larger than the sum of the radius of the resistance spot weld W1(W2) and the radius of the friction stir spot weld J. This makes it possible to prevent a situation in which the friction stir spot weld J and each of the resistance spot welds W1, W2 overlap with each other, and thereby a total welding (joining) area is reduced. As a result, the welding strength can be effectively improved.

The present invention is not limited to the above-described embodiment, and its configurations may be changed, added or deleted. For example, the welding pitch L between the friction stir spot weld J and the resistance spot weld W1 may be different from the welding pitch L between the friction stir spot weld J and the resistance spot weld W2. Although in the example of FIG. 4, the friction stir spot weld J is provided on a straight line connecting the pair of resistance spot welds W1, W2 to each other, the friction stir spot weld J may be provided at a location that is between the pair of resistance spot welds, on a curved line extending in the extending direction of curved portions in a case where the lapped portions of the plate materials have the curved portions in a top plan view (when viewed from above). The displacement driving unit may move the workpiece with respect to the tool. Further the number of plate materials which are lapped to each other and are spot welded may be set to three or more.

REFERENCE SIGNS LIST

1 spot welding apparatus
2 friction stir spot welding device
3 resistance spot welding device
10 tool
17 rotation driving unit
19 displacement driving unit
20 controller
50a lapped portions
51, 52 plate materials
100 joint structure
J friction stir spot weld
L welding pitch
W1, W2 resistance spot welds

The invention claimed is:

1. A spot welding apparatus that performs spot welding of a plurality of plate materials which are lapped to each other, the spot welding apparatus comprising:
   a resistance spot welding device forming a plurality of resistance spot welds in lapped portions of the plurality of plate materials; and
   a friction stir spot welding device including:
      a tool retaining member on which a tool is detachably mounted;
      a displacement driving unit that displaces the tool retaining member relative to the lapped portions;

a rotation driving unit that rotates the tool retaining member; and a controller including a processor, a volatile memory, and a non-volatile memory, the controller being programmed to, based on instructions of an operation program stored in the non-volatile memory, control and drive the displacement driving unit to move the tool retaining member toward the lapped portions and insert the tool retained by the tool retaining member into the lapped portions while the controller drives the rotation driving unit to simultaneously rotate the tool retaining member to perform friction stir spot welding, the controller being programmed to control the displacement driving unit in accordance with the instructions of the operation program that moves the tool retaining member to a region of the lapped portions located between the plurality of resistance spot welds formed by the resistance spot welding device and forms at least one friction stir spot weld in the region of the lapped portions, the controller being programmed to perform calculations by use of the volatile memory based on the operation program stored in the non-volatile memory to set a welding pitch between the at least one friction stir spot weld and each of the plurality of resistance spot welds to a value that is larger than a sum of a radius of each of the plurality of resistance spot welds and a radius of the at least one friction stir spot weld.

2. The spot welding apparatus according to claim 1, wherein the controller is programmed to perform calculations based on the operation program stored in the non-volatile memory to set a welding pitch between the at least one friction stir spot weld and each of the plurality of resistance spot welds to a welding pitch that is determined based on a tensile shear strength in a case where a pair of a friction stir spot weld and a resistance spot weld are formed in the plurality of plate materials is higher than a tensile shear strength in a case where a pair of resistance spot welds are formed in the plurality of plate materials.

3. The spot welding apparatus according to claim 1, wherein:
the plurality of plate materials are formed of steel, and
in a case where a welding pitch between the at least one friction stir spot weld and each of the plurality of resistance spot welds is Y and a thickness of each of a pair of plate materials is X,
the controller is programmed to set the welding pitch to meet $Y \leq -1.4X^2+18.6X+0.6$ in a case where the plate materials are low-carbon steel, and
the controller sets the welding pitch to meet $Y \leq -1.9X^2+25.5X+2.1$ in a case where the plate materials are medium-carbon steel or low-alloy steel.

4. The spot welding apparatus according to claim 2, wherein:
the plurality of plate materials are formed of steel; and
in a case where the welding pitch between the at least one friction stir spot weld and each of the plurality of resistance spot welds is Y and a thickness of each of a pair of plate materials is X,
the controller sets the welding pitch to meet $Y \leq -1.4X^2+18.6X+0.6$ in a case where the plate materials are low-carbon steel, and the controller sets the welding pitch to meet $Y \leq -1.9X^2+25.5X+2.1$ in a case where the plate materials are medium-carbon steel or low-alloy steel.

5. The spot welding apparatus according to claim 2, wherein the controller sets the welding pitch between the at least one friction stir spot weld and each of the plurality of resistance spot welds to a value which is larger than a sum of a radius of each of the plurality of resistance spot welds and a radius of the at least one friction stir spot weld.

6. The spot welding apparatus according to claim 3, wherein the controller sets the welding pitch between the at least one friction stir spot weld and each of the plurality of resistance spot welds to a value which is larger than a sum of a radius of each of the plurality of resistance spot welds and a radius of the at least one friction stir spot weld.

7. The spot welding apparatus according to claim 4, wherein the controller sets the welding pitch between the at least one friction stir spot weld and each of the plurality of resistance spot welds to a value which is larger than a sum of a radius of each of the plurality of resistance spot welds and a radius of the at least one friction stir spot weld.

* * * * *